F. A. SHOBERG.
COMBINED HANDLE AND PULLEY FOR CREAM SEPARATORS.
APPLICATION FILED DEC. 17, 1910.
1,000,303.
Patented Aug. 8, 1911.
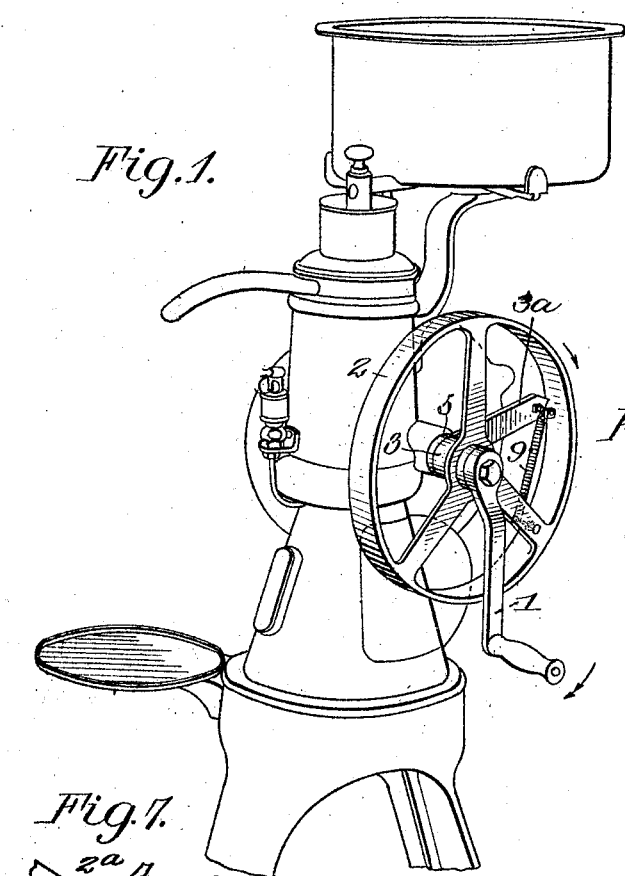
Fig.1.
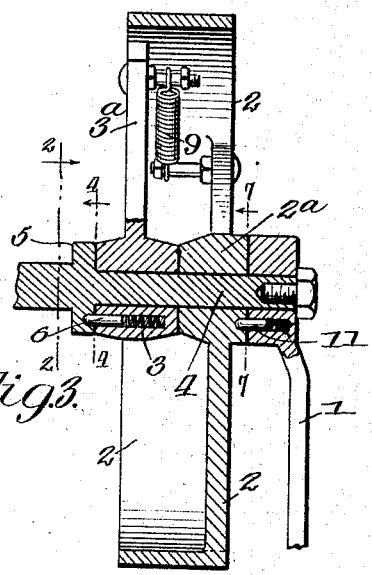
Fig.3.
Fig.4.
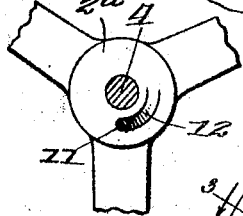
Fig.7.
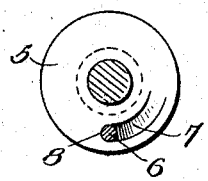
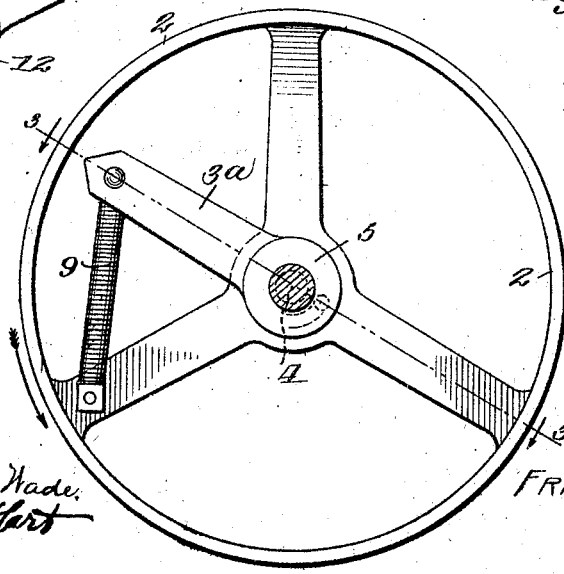
Fig.2.
Fig.5.
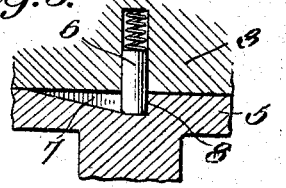
Fig.6.
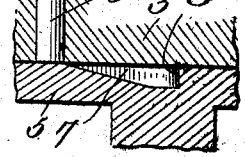
WITNESSES:
Samuel E. Wade.
Amos W. Hart
INVENTOR
FRANK A. SHOBERG.
BY Munn & Co.
ATTORNEYS

UNITED STATES PATENT OFFICE.

FRANK A. SHOBERG, OF HOT SPRINGS, SOUTH DAKOTA.

COMBINED HANDLE AND PULLEY FOR CREAM-SEPARATORS.

1,000,303. Specification of Letters Patent. Patented Aug. 8, 1911.

Application filed December 17, 1910. Serial No. 597,792.

*To all whom it may concern:*

Be it known that I, FRANK A. SHOBERG, a citizen of the United States, and a resident of Hot Springs, in the county of Fall River and State of South Dakota, have invented an Improved Combined Handle and Pulley for Cream-Separators, of which the following is a specification.

It is important that centrifugal cream-separators shall be run at a uniform speed, and, since the gas engines or other motors ordinarily employed for driving them often rotate at varying speeds, or, in common parlance, have a "jerky" motion, spring attachments have been devised for connecting the band-wheel or -pulley with the shaft of the separator.

My invention is an improvement in this line, and is embodied in the construction, arrangement, and combination of parts hereinafter described, and illustrated in the accompanying drawing, in which—

Figure 1 is a perspective view of a centrifugal cream-separator with my invention applied. Fig. 2 is an enlarged vertical section on the line 2—2 of Fig. 3. Fig. 3 is a transverse section on the line 3—3 of Fig. 2. Fig. 4 is a vertical cross section on the line 4—4 of Fig. 3. Figs. 5 and 6 are sectional views illustrating the ratchet clutch connecting the armed hub with the collar of the separator shaft. Fig. 7 is a cross section on the line 7—7 of Fig. 3.

A crank 1, a band-wheel or -pulley 2, and a hub 3, having a radial arm 3ª, are all mounted loose on the journal 4 of the separator shaft, and are operatively connected with each other and the shaft by means to be now described.

The shaft 4 is provided with a collar 5 at the inner end of its journal, and the armed hub 3 has a spring-projected pin 6—see Figs. 3 to 7—that enters a recess 7 in the collar 5, which recess is provided at its deeper end with a shoulder 8. The recess is formed upon the arc of a circle concentric with the shaft journal, and its bottom is inclined inward from the face of the collar to the shoulder 8, as clearly indicated in Figs. 4, 5, and 6. Thus, what may be termed a ratchet clutch is formed, which serves to lock the hub to the shaft when the hub is turned to the right, in which case the pin slides into the recess 7 and down the inclined bottom of the same until it abuts the shoulder 8, as shown in Figs. 4 and 6.

The outer end of the hub arm 3ª is connected by a spiral spring 9 to a pin projecting from the outer end of one of the pulley spokes. The arrangement of the spring 9 is such that when the band-wheel or -pulley 2 is rotated to the right, as indicated by arrow in Fig. 1, traction will be applied, through the spring, to the hub arm, so that the hub 3 will be carried around in the same direction and its spring-pin 6 will thus be caused to ride into the recess 7 and engage the shoulder 8 on the shaft collar, as shown in Figs. 4 and 5. The pulley 2 is, therefore, elastically connected to the hub and through it to the shaft, so that the "jerky" motion of the gas-motor will not be transmitted, or at least in but very slight degree, to the separator shaft, which will be consequently run at a practically uniform speed.

The connection between the crank 1 and the hub 2ª of the pulley is illustrated in Figs. 1 and 7. The connection is effected by means of a ratchet clutch similar in all respects, as well as in operation, to the ratchet clutch already described as connecting the hub 3 with the shaft collar 5. That is to say, a spring-projected pin 11 is arranged in the hub of the crank and projects into a shouldered recess 12 as indicated in Fig. 7. The bottom of the recess 12 being inclined in the same way as the recess 7 of the shaft collar, it is apparent that, when the crank is rotated to the right, or in the direction of the double arrow (Fig. 1), the pin will ride into the recess and engage the shoulder thereof, so as to rotate the band wheel or pulley 1 with it. The crank is used when it is desired to start the machine and its rotation is kept up until the speed equals that which it is desired the machine shall have when operated by the motor. In other words, the belt, which in practice runs from the motor on the pulley 2, is not slipped on the latter until its rotation has attained the desired maximum. Then, the crank being released, it will thenceforth hang vertical by gravity and its spring pin 11 will slide over or through the recess 7 without engagement with the hub of the band-wheel.

The entire attachment, comprising the crank, the band wheel, and the armed hub, may be applied to various separators by simply providing a shaft with a longer journal than usual.

What I claim is:—

The improvement hereinbefore described, consisting, in combination with the journal of a separator shaft, of a hub having a radial arm, a band pulley and a crank both mounted loose on the journal along with the hub, a ratchet and spring clutch connecting the hub with the shaft and another clutch connecting the crank with the band pulley, whereby they are locked together only when the crank is rotated in one direction, and a spiral spring connecting the outer end of the hub arm with a spoke of the band pulley, as shown and described.

FRANK A. SHOBERG.

Witnesses:
G. TILLMAN THOMPSON,
HENRY MARTY.